(12) United States Patent
Yoo et al.

(10) Patent No.: US 8,983,295 B2
(45) Date of Patent: Mar. 17, 2015

(54) OPTICAL LINE TERMINAL AND METHOD OF REGISTERING OPTICAL NETWORK TERMINAL THEREOF

(71) Applicant: Electronics and Telecommunications Research Institute, Daejeon (KR)

(72) Inventors: Hark Yoo, Gwangju (KR); Geun Yong Kim, Gwangju (KR); Youngsuk Lee, Gwangju (KR); Sung Chang Kim, Gwangju (KR); Dongsoo Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 31 days.

(21) Appl. No.: 13/873,910

(22) Filed: Apr. 30, 2013

(65) Prior Publication Data
US 2014/0178072 A1 Jun. 26, 2014

(30) Foreign Application Priority Data
Dec. 24, 2012 (KR) .......................... 10-2012-0152410

(51) Int. Cl.
 *H04J 14/00* (2006.01)
 *H04Q 11/00* (2006.01)
(52) U.S. Cl.
 CPC ................................ *H04Q 11/0067* (2013.01)
 USPC ................... 398/72; 398/66; 398/67; 398/58; 398/70; 398/71; 398/100; 370/352; 370/389; 370/392; 370/468

(58) Field of Classification Search
 USPC ........... 398/66, 67, 68, 69, 70, 71, 72, 98, 99, 398/100, 58, 33, 25; 370/352, 392, 389, 370/468, 466
 See application file for complete search history.

(56) References Cited

U.S. PATENT DOCUMENTS

| 2010/0040371 | A1* | 2/2010 | Wu et al. .......................... 398/58 |
| 2011/0262139 | A1* | 10/2011 | Costa et al. ...................... 398/66 |
| 2014/0186039 | A1* | 7/2014 | Luo et al. ......................... 398/66 |

FOREIGN PATENT DOCUMENTS

| KR | 10-0715679 B1 | 5/2007 |
| KR | 10-0827105 B1 | 4/2008 |
| KR | 10-1045688 B1 | 6/2011 |

* cited by examiner

*Primary Examiner* — Hanh Phan
(74) *Attorney, Agent, or Firm* — Rabin & Berdo, P.C.

(57) ABSTRACT

The inventive concept relates to an optical line terminal registering optical network terminals having overlapping serial numbers. The optical line terminal may include a memory storing serial number information of optical network terminals of which a registration is completed in a storage region; and a control part that if a serial number by a serial number request is received from optical network terminals, the received serial number is compared with the serial number information of the memory and if they overlap each other, a previously set preliminary identifier is allocated to the optical network terminal having an overlapping serial number.

18 Claims, 3 Drawing Sheets

OPTICAL LINE TERMINAL AND METHOD OF REGISTERING OPTICAL NETWORK TERMINAL THEREOF

CROSS-REFERENCE TO RELATED APPLICATIONS

This U.S. non-provisional patent application claims priority under 35 U.S.C. §119 of Korean Patent Application No. 10-2012-0152410, filed on Dec. 24, 2012, the entire contents of which are hereby incorporated by reference.

BACKGROUND

The present inventive concept herein relates to optical communication systems, and more particularly, to an optical line terminal registering an optical network terminal having overlapping serial numbers and a method of registering an optical network terminal thereof.

A passive optical network (hereinafter it is referred to as 'PON') provides a wideband to subscribers and accommodates various multi protocols. A PON has a structure connecting various optical network terminals (hereinafter it is referred to as 'ONT') or various optical network units (hereinafter it is referred to as 'ONU') to an optical line terminal (hereinafter it is referred to as 'OLT') through a passive device using a point to multi-point method.

In the PON system having a structure like that, the OLT transmits a declining data frame to various ONTs and the various ONTs transmit an upward data frame to the OLT only in the allocated time. In the PON system, the OLT performs a certification procedure for transmitting an upward traffic to the various ONTs which are connected.

A certification operation in the OLT may be divided into a registration operation registering a serial number of the ONTs and a ranging operation performing a ranging. In a single network, ONTs located at the same distance or at a different distance may have the same serial number. ONTs which are located at physically same distance and have the same serial number are allocated the same optical network unit_IDentifier (hereinafter it is referred to as 'ONU_ID') from the OLT. Thus, in the ranging operation, ONTs having the same serial number respond at the same time. As response messages between the ONTs having the same serial number collide with each other, there was a problem that the certification operation cannot be normally performed.

In the case that ONTs located at a different distance have the same serial number, response messages between the ONTs do not collide with each other. However, since ONTs having the same serial number are allocated the same compensation value, an upward traffic may be transmitted in time which the OLT does not allow. There was a problem that data cannot be normally transmitted or received due to the upward traffic transmitted in the time which the OLT does not allow.

SUMMARY

Embodiments of the inventive concept provide an optical line terminal. The optical line terminal may include a memory storing serial number information of optical network terminals of which a registration is completed in a storage region; and a control part that if a serial number by a serial number request is received from optical network terminals, the received serial number is compared with the serial number information of the memory and if they overlap each other, a previously set preliminary identifier is allocated to the optical network terminal having an overlapping serial number.

Embodiments of the inventive concept also provide a method of registering an optical network terminal of an optical line terminal. The method may include transmitting a serial number request message to optical network terminals; receiving a serial number from the optical network terminals in response to the serial number request; judging whether the received serial number is overlapped; and allocating a preliminary identifier different from an identifier allocated to an optical network terminal having an overlapping serial number to the optical network terminal having an overlapping serial number if the serial number is overlapped.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
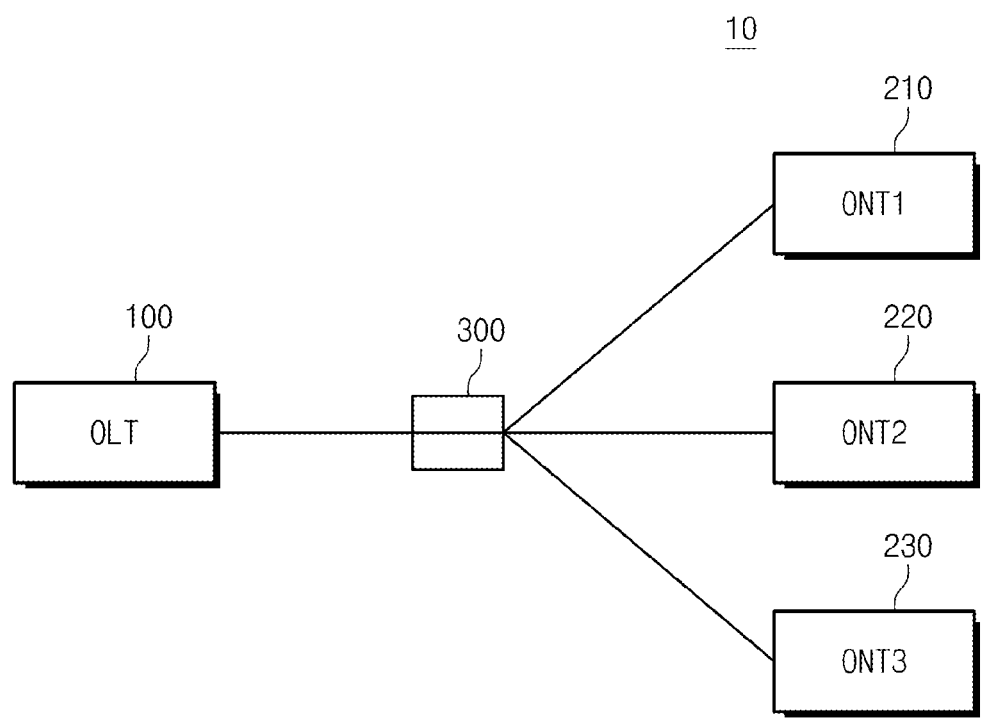
FIG. 1 is a drawing illustrating a passive optical network system in accordance with some example embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

FIG. 1 is a drawing illustrating a passive optical network system in accordance with some example embodiments of the inventive concept.

The inventive concept provides an optical line terminal (hereinafter it is referred to as 'OLT') registering optical network terminals (hereinafter it is referred to as 'ONT') having overlapping serial numbers in a passive optical network (hereinafter it is referred to as 'PON').

Referring to FIG. 1, a PON system 10 may include an OLT 100, ONTs 210, 220 and 230, and a passive device 300.

The OLT 100 transmits a declining data frame to the ONTS 210, 220 and 230 or receives an upward data frame from the ONTS 210, 220 and 230. The OLT 100 performs a registration operation and a ranging operation for transmitting and receiving a data frame to and from the ONTS 210, 220 and 230.

The ONTs 210, 220 and 230 may be connected to one OLT 100 to form a tree structure corresponding to 1:N. The ONTs 210, 220 and 230 may be connected to an optical network unit (hereinafter it is referred to as 'ONU') or may be substituted. The ONTs 210, 220 and 230 may include various kinds of subscriber network terminating device.

The passive device 300 connects the OLT 100 and the ONTs 210, 220 and 230. The passive device 300 includes an optical distribution network (hereinafter it is referred to as 'ODN'). The passive device 300 has a tree topology structure. The passive device 300 distributes a declining data frame being transmitted from the OLT 100 to the ONTs 210, 220 and 230 and multiplexes an upward data frame being transmitted from the ONTs 210, 220 and 230 to transmit the multiplexed upward data frame to the OLT 100.

The OLT 100 in the PON system transmits and receives the ONTs 210, 220 and 230 and a data frame through a registration operation and a ranging operation using a serial number (SN). However, the ONTs 210, 220 and 230 may have overlapping serial numbers. Thus, the OLT 100 suggested by the present inventive concept allocates a preliminary identifier, that is, a preliminary optical network unit_IDentifier (hereinafter it is referred to as 'preliminary ONU_ID') to another ONT having an overlapping serial number with a serial number of an ONT to which an identifier, that is, an ONU_ID is previously allocated. The preliminary ONU_ID has a different value from the pre-allocated ONU_ID.

As the OLT 100 performs a registration operation and a ranging operation using a preliminary ONU_ID, data can be normally transmitted and received between ONTs having overlapping serial numbers.

Figure 2:
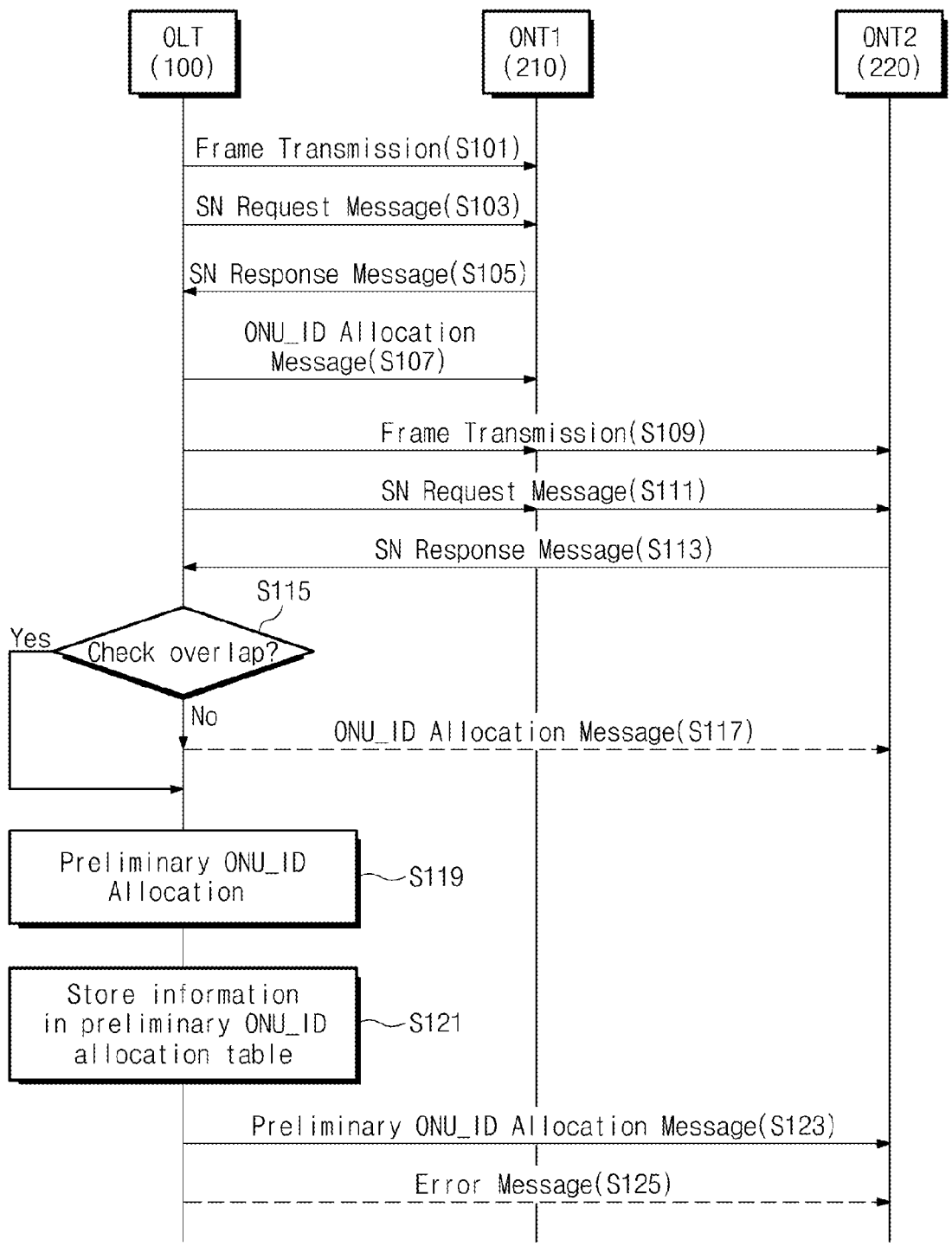
FIG. 2 is a signal flow chart illustrating a registration operation of the optical network terminals having overlapping serial numbers in a passive optical network system in accordance with some example embodiments of the inventive concept.

FIG. 2 is a signal flow chart illustrating a registration operation of the optical network terminals having overlapping serial numbers in a passive optical network system in accordance with some example embodiments of the inventive concept.

Referring to FIG. 2, the PON system includes the OLT 100, the first ONT 210 and the second ONT 220. The first ONT 210 and the second ONT 220 may have overlapping serial numbers.

The OLT 100 transmits a frame not having band allocation information to register a serial number (S101). The OLT 100 opens a quiet zone through transmission of frame not having band allocation information.

If the quiet zone is opened, the OLT 100 transmits a serial number request message requesting a serial number in the form of broadcast (S103).

The first ONT 210 which received a serial number request message transmits a serial number response message including a serial number and a random delay value to the OLT 100 (S105). The serial number response message is a kind of control message and includes a serial number and a random delay value. The first ONT 210 may store a random delay value in an internal memory.

If the OLT 100 receives a serial number response message from the first ONT 210, it extracts a serial number and a random delay value included in the serial number response message. The OLT 100 checks whether the extracted serial number overlaps a serial number which previously allocated an ONU_ID. If the extracted serial number is a serial number which did not previously allocate ONU_ID, that is, a serial number which is not overlapped, the OLT 100 allocates an ONU_ID corresponding to the serial number.

The OLT 100 transmits an ONU_ID allocation message which allocated the ONU_ID to the first ONT 210 (S107). If the first ONT 210 is allocated the ONU-ID, it completes a serial registration operation. After that, the OLT 100 and the first ONT 210 may perform a ranging operation.

Although not illustrated in the drawing, the ranging operation may be described as follows.

The OLT 100 allocates time that can transmit an upward data frame to ONTs including the first ONT 210. The OLT 100 requests a serial number of the first ONT 210 in the form of unicast. The first ONT 210 to which a serial number is requested transmits the serial number and the allocated ONU-ID to the OLT 100. The OLT 100 measures a distance of the first ONT 210 through a ranging and determines a compensation value, for example, an equalization delay (EqD) on the basis of the measured distance. The OLT 100 transmits the compensation value to the first ONT 210. If the first ONT 210 normally receives the compensation value from the OLT 100, a ranging operation is completed. After that, the first ONT 210 can transmit an upward data frame and can receive a downward data frame during the time which the OLT 100 allocates.

In a next serial number registration period, the OLT 100 transmits a frame not having band allocation information for a serial number registration (S109). A serial number registration operation may be repeated over a period of a predetermined time interval. The OLT 100 opens a quiet zone through transmission of a frame not having band allocation information. Assume that the first ONT 210 and the second ONT 220 receive a frame of the OLT 100.

If a quiet zone of the OLT 100 is opened, the OLT 100 transmits a serial number request message requesting a serial number in the form of broadcast (S111). The second ONT 220 which received the serial number request message transmits a serial number response message including a serial number and a random delay value to the OLT 100 (S113). The serial number response message is a kind of control message and includes the serial number and the random delay value. The second ONT 220 may store the random delay value in an internal memory.

If the OLT 100 receives the serial number response message from the second ONT 220, it extracts the serial number and the random delay value included in the serial number response message. The OLT 100 checks whether the extracted serial number overlaps the serial number which previously allocated an ONU_ID.

If the extracted serial number is a serial number which did not allocate an ONU_ID, that is, a serial number that is not overlapped, the OLT 100 allocates an ONU_ID corresponding to the serial number.

The OLT 100 transmits an allocation message which allocated an ONU_ID to the second ONT 220 (S117). If the second ONT 220 is allocated the ONU_ID, it completes a serial number registration operation. After the OLT 100 and the second ONT 220 complete a serial number registration operation, they can perform the ranging operation described above.

Unlike this, if the extracted serial number is a serial number which allocated an ONU_ID, that is, a serial number that is overlapped, the OLT 100 allocates a preliminary ONU_ID. The preliminary ONU_ID has a different value from an ONU_ID allocated to the first ONT 210. The preliminary ONU_ID may be stored in an internal memory of the OLT 100 in advance.

The OLT 100 manages information (including a serial number of the second ONT 220) about ONTs which allocated the preliminary ONU_IDs to the internal memory in the form of preliminary ONU_ID allocation table and stores information about a preliminary ONU_ID allocation of the second ONT 220 in a preliminary ONU_ID allocation table (S121).

The OLT 100 transmits the preliminary ONU_ID allocation message including the allocated preliminary ONU_ID to the second ONT 220 (S123). If the second ONT 220 is allocated the preliminary ONU_ID, it completes a serial number registration operation.

The OLT 100 sets up a control channel and transmits an error message due to an overlap of the serial number with respect to the second ONT 220 through the set up control channel (S125). As the OLT 100 registers the second ONT 220 having the same serial number as the first ONT 210, it allocates a transmission band which is differentiated from ONTs using a normal ONU_ID to the second ONT 220 which allocated the preliminary ONU_ID. The OLT 100 can set up a control channel to the second ONT 220 through the band allocation. An error message transmitted through the control channel may be output to a user using the second ONT 220.

The OLT 100 may transmit an image which allocated a new serial number to the second ONT 220 through the set control channel. This can make the OLT 100 reset a serial number of the second ONT 220. The OLT 100 may allocate a new serial number to the second ONT through the error message. A registration operation and a ranging operation may be performed again through a reset of serial number of the second ONT 220 having an overlapping serial number.

After that, even though the OLT 100 and the second ONT 220 have a serial number overlapped with the first ONT 210, they can complete a serial number registration operation. After setting a control channel between the second ONT 220 and the OLT 100, the second ONT 220 may perform the ranging operation described above.

Figure 3:
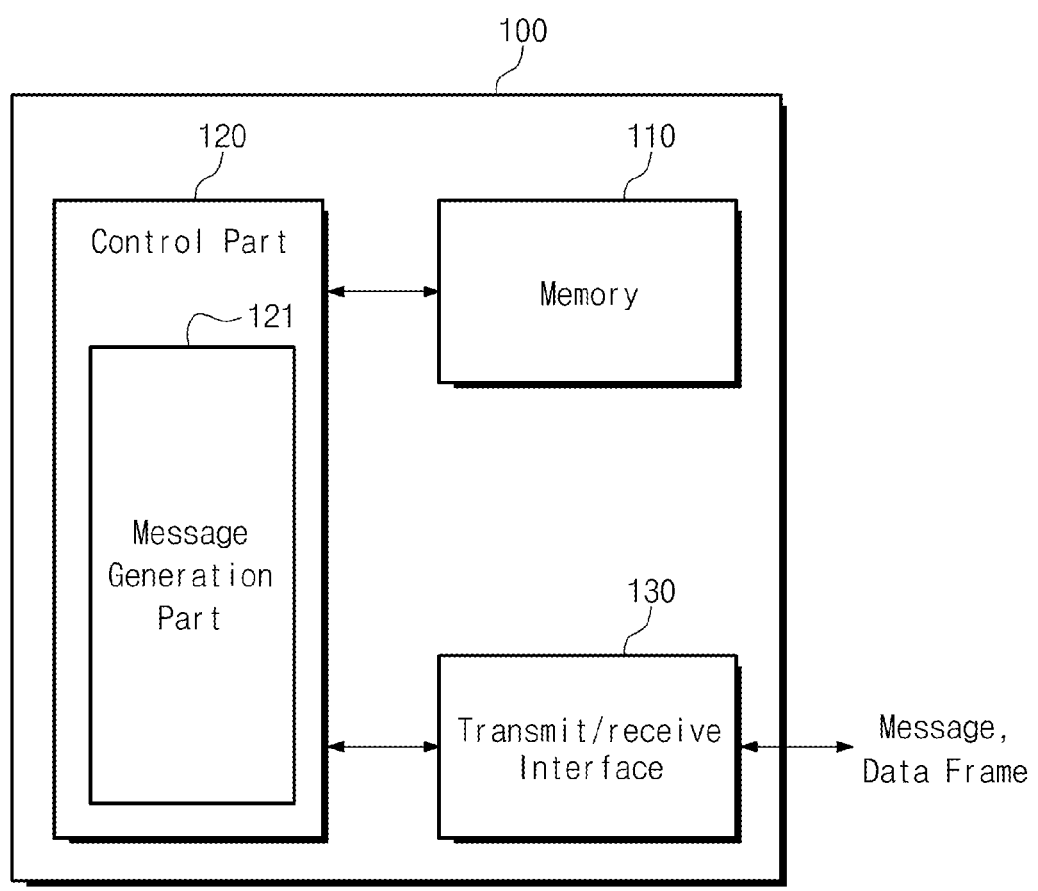
FIG. 3 is a drawing illustrating an optical line terminal in accordance with some example embodiments of the inventive concept.

FIG. 3 is a drawing illustrating an optical line terminal in accordance with some example embodiments of the inventive concept.

Referring to FIG. 3, the optical line terminal 100 may include a memory 110, a control part 120 and a transmit/receive interface 130.

The memory 110 stores information of ONTs that occurs according to a registration operation and a ranging operation with respect to the ONTs in a storage region. Thus, serial numbers of ONTs to which ONT_ID is allocated in the memory 110. The memory 110 may store information about preliminary ONU_IDs which will be allocated to ONTs having an overlapping serial number and may store information of ONTs which is allocated the preliminary ONU_ID in a table form. The table stored in the memory 110 may be managed through a control of the control part 120.

The control part 120 transmits a declining data frame through a registration operation and a ranging operation with respect to a plurality of ONTs and performs a control operation of a band allocation and a data frame transmission time allocation for controlling a reception operation of an upward data frame.

The control part 120 includes a message generation part 121. The message generation part 121 generates a serial number request message for requesting a serial number from the ONTs. The message generation part 121 generates an ONU_ID allocation message allocating an ONU_ID of a general ONU having a serial number which is not overlapped and a preliminary ONU_ID allocation message of ONT having an overlapping serial number. In addition, the message generation part 121 may generate an error message representing an error occurrence due to having an overlapping serial number.

The control part 120 receives a serial number response message corresponding to a serial number request message from the ONTs from the ONTs. If receiving serial numbers of ONTs, the control part 120 checks whether the received serial numbers of ONTs overlap serial numbers of ONTs that are already registered in the memory. The control part 120 allocates a preliminary ONU_ID stored to the memory to ONTs having an overlapping serial number. The control part 120 controls so that a preliminary ONU_ID allocation message is transmitted to an ONT having an overlapping serial number. The preliminary ONU_ID allocation message includes a random number value and a preliminary ONU_ID included in a serial number response message.

Descriptions will be made based on the first ONT 210 and the second ONT 220 of FIG. 2 having an overlapping serial number. The control part 120 allocates a preliminary ONU_ID which is distinct from an ONU_ID of the first ONT 210 to the second ONT 220 having a serial number overlapping the first ONT 210. The control part 120 can transmits and receives an upward/downward data frame without collision between ONTs having overlapping serial numbers.

The transmit/receive interface 130 is connected to a plurality of ONTs and performs transmit/receive of data frame. The transmit/receive interface 130 transmits a message and a data frame being received from the control part 120 to the plurality of ONTs and transmits a message and a data frame being received from the plurality of ONTs to the control part 120.

Thus, in the inventive concept, the OLT 100 may be applied to a registration operation of ONTs having a same serial number in a single network regardless of locations of ONTs.

The OLT 100 in the PON system of the inventive concept can prevent a same ONU_ID from being allocated to ONTs having a same serial number by allocating a separate preliminary ONU_ID to an optical network terminal (ONT) having an overlapping serial number. The OLT 100 is provided with status information about an ONT by setting up a control channel and may provide error information to a system manager or a subscriber.

The PON system of the inventive concept can prevent a delay of registration operations of other ONTs by making a registration operation and a ranging operation of ONTs having an overlapping serial number be normally performed. The PON system can easily process a failure of ONT having a same serial number.

The OLT can prevent collisions between ONTs having overlapping serial numbers at a certification operation by allocating a preliminary identifier that is not overlapped to ONTs having overlapping serial numbers. The OLT can normally transmit and receive data by allocating different identifiers to ONTs having overlapping serial numbers.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An optical line terminal comprising:
    a memory storing serial number information of optical network terminals of which a registration is completed in a storage region; and
    a control part that if a serial number by a serial number request is received from optical network terminals, the received serial number is compared with the serial number information of the memory and if they overlap each other, a previously set preliminary identifier is allocated to the optical network terminal having an overlapping serial number, wherein the control part receives a random delay value in response to the serial number request and transmits the random delay value together with the allocated preliminary identifier.

2. The optical line terminal of claim 1, wherein the control part stores information of the optical network terminal to which the preliminary identifier is allocated in the memory in a table form.

3. The optical line terminal of claim 1, wherein the control part comprises a message generation part generating a serial number request message for the serial number request and a preliminary identifier allocation message allocating the preliminary identifier.

4. The optical line terminal of claim 3, wherein the message generation part generates an error message representing occurrence of serial number overlap error with respect to an optical network terminal having an overlapping serial number.

5. The optical line terminal of claim 4, wherein the message generation part allocates a new serial number to the optical network terminal having the overlapping serial number through an error message.

6. The optical line terminal of claim 4, further comprising a transmit/receive interface receiving the serial number and transmitting the serial number request message, the preliminary identifier allocation message and the error message.

7. The optical line terminal of claim 1, wherein the preliminary identifier has a different value from an identifier allocated to the optical network terminal of which a registration is completed.

8. A method of registering an optical network terminal of an optical line terminal comprising:
   transmitting a serial number request message to optical network terminals;
   receiving a serial number from the optical network terminals in response to the serial number request;
   judging whether the received serial number is overlapped;
   allocating a preliminary identifier different from an identifier allocated to an optical network terminal having an overlapping serial number to the optical network terminal having an overlapping serial number if the serial number is overlapped;
   setting up an optical network terminal having the overlapping serial number and a control channel; and
   transmitting an error occurrence message due to an overlap of the serial number through the control channel.

9. The method of claim 8, wherein receiving the serial number further comprises receiving a random delay value generated in an optical network terminal corresponding to the serial number.

10. The method of claim 9, further comprising transmitting the allocated preliminary identifier and the random delay value to the optical network terminal.

11. The method of claim 8, further comprising performing a ranging operation on the basis of the preliminary identifier from the optical network terminal.

12. The method of claim 8, further comprising resetting a serial number of an optical network terminal having the overlapping serial number through the control channel.

13. A method of registering an optical network terminal (ONT) of an optical line terminal (OLT), comprising:
   transmitting a serial number request message to the ONT;
   receiving a serial number sent by the ONT in response to the serial number request message; and
   judging whether the received serial number overlaps a serial number that has already been registered by another ONT to the OLT,
      upon determining that the received serial number does not overlap a already registered serial number, allocating an identifier corresponding to the received serial number to the ONT, and
      upon determining that the received serial number overlaps a serial number that has already been registered by another ONT,
         ascertaining an identifier that corresponds to the already registered serial number and that has been allocated to the another ONT, and
         allocating a preliminary identifier different from the ascertained identifier to the ONT.

14. The method of claim 13, wherein receiving the serial number further comprises receiving a random delay value corresponding to the serial number from the ONT.

15. The method of claim 14, further comprising transmitting the allocated preliminary identifier and the random delay value to the optical network terminal.

16. The method of claim 13, further comprising performing a ranging operation on the basis of the preliminary identifier from the optical network terminal.

17. The method of claim 13, further comprising, upon determining that the received serial number overlaps a serial number that has already been registered by another ONT,
   setting up a control channel to the ONT; and
   transmitting an error occurrence message indicating an overlap of the serial number through the control channel.

18. The method of claim 17, further comprising resetting the serial number of the ONT through the control channel.

* * * * *